United States Patent [19]

Brattsand et al.

[11] 3,928,326

[45] Dec. 23, 1975

[54] PROCESS FOR THE SEPARATION OF STEREOISOMERIC MIXTURES INTO THEIR COMPONENTS AND COMPONENTS OBTAINED HEREBY

[75] Inventors: Ralph Lennart Brattsand; Bo Thuresson af Ekenstam, both of Molndal; Karl Göran Claeson, Göteborg; Bror Arne Thalén, Molndal, all of Sweden

[73] Assignee: AB Bofors, Bofors, Sweden

[22] Filed: May 14, 1973

[21] Appl. No.: 359,913

[52] U.S. Cl............................................. 260/239.55 D
[51] Int. Cl.² .............................................. C07J 17/00
[58] Field of Search ............................ 260/239.55 D

[56] References Cited
UNITED STATES PATENTS

| | | | |
|---|---|---|---|
| 3,048,581 | 8/1962 | Fried | 260/239.55 |
| 3,128,238 | 4/1964 | Mallett | 195/51 |
| 3,133,940 | 5/1964 | Oughton et al. | 260/397.45 |

FOREIGN PATENTS OR APPLICATIONS

| | | | |
|---|---|---|---|
| 778,364 | 2/1968 | Canada | 260/56 |
| 933,867 | 8/1963 | United Kingdom | 260/239.55 D |

OTHER PUBLICATIONS

Leitch et al., J. of Chromatography, Vol. 28, pp. 132–134, (1967).
Baezuk et al., J. of Chromatography, Vol. 60, pp. 351–361, (1971), Sephadex, G–10 & G–15.
Herzog et al., Tetrahedron, Vol. 18, 1962, pp. 581–586.
Buzby et al., Jour. Medicinal Chem., Vol. 10, 1967, pp. 199–202.

*Primary Examiner*—Elbert L. Roberto
*Attorney, Agent, or Firm*—Gordon W. Hueschen

[57] ABSTRACT

A process for the resolution of stereoisomeric mixtures of certain steroids obtained by synthesis into its components, comprising subjecting the stereoisomeric mixture to gel filtration, the components in view of different retention volumes being separated and being separately recoverable; and stereoisomeric components A and B thereby obtained, pharmaceutical compositions thereof; and method of treating inflammation therewith.

23 Claims, No Drawings

PROCESS FOR THE SEPARATION OF STEREOISOMERIC MIXTURES INTO THEIR COMPONENTS AND COMPONENTS OBTAINED HEREBY

The present invention refers to a process for the separation of a stereoisomeric mixture of certain steroids obtained by synthesis into its components, below called component A and component B. The invention also refers to stereoisomeric components A and B thereby obtained, pharmaceutical compositions thereof and method of treating inflammation therewith.

It is a well-known fact that mixtures of stereoisomers having the same molecular weight and in other respects possessing practically identical solubility characteristics may be extremely difficult to separate. It is, therefore, highly surprising that in conformity with the present invention it has been shown possible to separate the stereoisomeric components by gel filtration. The gel filtration technique is normally used to separate molecules having a lower molecular weight from molecules having a higher molecular weight. Stereoisomers, the molecules of which have the same molecular weight, are therefore not expected to have the same retention volume in gel filtration in view of which they would thus not be separable by this procedure. Therefore, it was most surprising that the stereoisomeric components A and B having the same molecular weight may still be separated with excellent result using this procedure.

The separation process according to the present invention has made it possible to investigate the physiological characteristics of the separated stereoisomeric components. In this connection it has surprisingly been found that one of the stereoisomeric components, component B, has consistently physiologically better characteristics than the other stereoisomeric component, component A, and that it is also better than the original mixture in this respect. Thus it is possible by the process of the present invention to prepare in a pure form new stereoisomeric components, which have certain advantages over the original synthetic stereoisomeric mixtures.

More precisely, the present invention refers to steroids having the general formula:

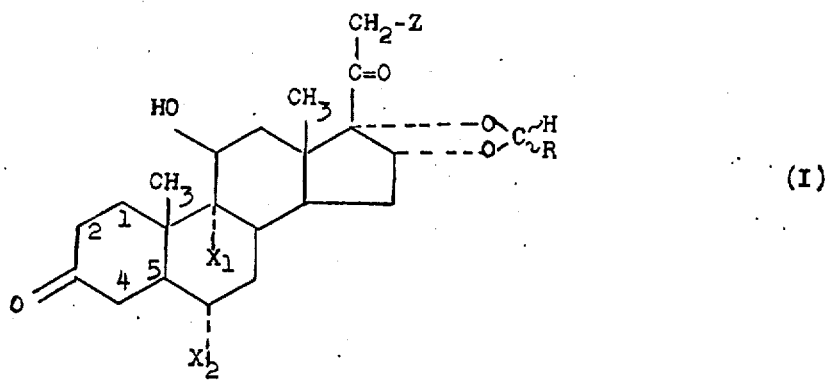

(I)

wherein the 1,2 and 4,5-positions are saturated or a double bond is present in at least one of said two positions, R is a straight or branched alkyl having 1–10, preferably 1–6 carbon atoms, $X_1$ and $X_2$ are independently selected from hydrogen and fluorine, $X_1$ being selected from hydrogen and fluorine when $X_2$ is hydrogen and $X_1$ being fluorine when $X_2$ is fluorine, Z is hydroxyl, possibly esterified, preferably having a maximum of 12 carbon atoms, if any, in the esterifying group. The individual stereoisomeric components present in a mixture of a steroid having the above formula I may be elucidated in the following way:

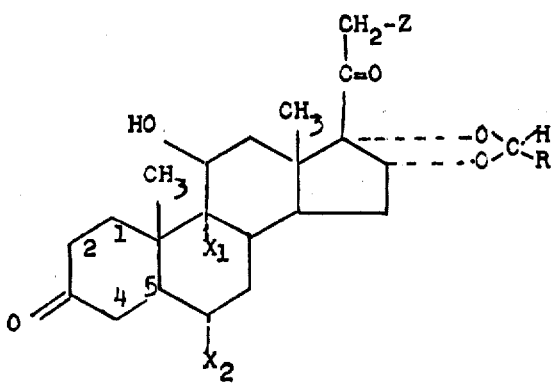

A and

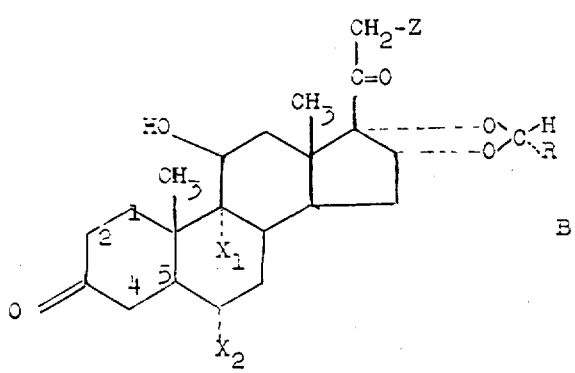

In the above formulas the stereoisomeric components differ from each other with regard to the space orientation about the 2'-carbon atom in the dioxolane ring.

As introductorily indicated the process according to the invention consists in subjecting a stereoisomeric mixture or a stereoisomeric pair of steroids having the above formula I to gel filtration, the stereoisomeric components A and B being separated in view of different retention volumes and being separately recoverable. The gel filtration may be carried out on many different types of gel materials. One type of such materials is hydroxypropylated cross-linked dextrane gels of the type Sephadex LH, for instance Sephadex LH 20 sold by Pharmacia Fine Chemicals, Uppsala, Sweden, resulting in a good fractionation within the molecular weight range 100–4000. Another useful gel type consists of copolymers of vinyl acetate having such exclusion limits as to be useful in the molecular weight range up to about 1000. One such vinyl acetate gel useful in this connection is Merckogel, type OR PVA 2000 sold by AG E. Merck, Darmstadt, Western Germany. The gel material is used in equilibrium with a suitable solvent. As an eluting agent halogenated hydrocarbons, ethers or esters or mixtures thereof, may be used, and chloroform, methylene chloride, ethylene chloride tetrahydrofurane, dioxane and ethyl acetate have been used successfully. Hereby an excellent separation of stereoisomer A from stereoisomer B will be obtained, and the stereoisomeric mixture A, B may, of course, also in an excellent way be removed from by-products formed in the steroid synthesis.

In formula I above the hydroxyl group in 21-position may be esterified with a fatty acid. Such fatty acid may have a straight or branched hydrocarbon chain and preferably contain 1–12 carbon atoms. As examples of suitable acids acetic acid, propionic acid, butyric acid, valeric acid, isovaleric acid, trimethyl acetic acid, hexanoic acid, tert.-butylacetic acid, octanoic acid may be used. It may also be esterified with a heterocyclic carboxylic acid, for instance pyridine—3—, pyridine—4—, and benzofurane-2-carboxylic acids; or menthoxymethyl carboxylic acid. For the preparation of water-soluble derivatives the esterification may be carried out with dicarboxylic acids having preferably 2 to 12 carbon atoms, or with phosphoric or sulphuric acids.

The steroids I in the form of cyclic acetals may be synthesized in a manner known per se starting from the 16α, 17α-dihydroxy steroids and an aldehyde in the presence of an acid catalyst, for instance perchloric acid, p-toluene, sulphonic acid, hydrochloric acid etc., in dioxane or another suitable solvent. The reaction results in a mixture of stereoisomers, A and B, having the same molecular weight and practically identical solubility characteristics, and the stereoisomers have been found to be extremely difficult to separate by conventional methods for the separation of stereoisomers, for instance by recrystallization.

The invention will now be further illustrated by non-limiting examples. In the examples there is used for the chromatography a column having a length of 85 cm, an inner diameter of 2.5 cm, the flow rate being 1 ml/min. The retention volumes given in the examples refer to chloroform as eluting agent.

In the gel filtration on the column it has been found to be easier to separate the by-products from the isomeric mixture in the crude product than to separate the isomers from each other, since the former show greater differences in retention volumes than the latter. It has also been found that the solubility of the crude product as well as the solubility of the purified isomeric mixture decreases, whereas the separation degree increases with decreasing polarity of the solvents used. This is particularly true with regard to the derivatives substituted with a shorter side chain on the 2'-carbon atom of the dioxolane ring. In the chromatographic separation of the examples below it has therefore turned out to be advantageous first to separate the isomeric mixture from the by-products of the crude product by means of a somewhat more polar solvent and then to separate the isomers from each other by means of a solvent possessing a lower polarity. This results in several advantages. Firstly, the whole capacity of the column may be utilized and great amounts of crude product may be freed from by-products in each application. Secondly, a possible partial use of the column capacity resulting from limitations in the solubility of the isomeric mixture in the solvents having a lower polarity may be compensated by making new test applications on the column at relatively short intervals day and night without awaiting the previous application to leave the column. The solvents which have been found to be highly active in the pre-separation, such as methylene chloride, ethylene chloride, tetrahydrofurane and ethyl acetate, have also given a completely satisfactory isomeric separation, whereas chloroform and dioxane have given an even better result with regard to the isomers most difficult to separate.

In all examples the molecular weights are determined by mass spectroscopy, and in all NMR-investigations tetramethylsilane has been used as an internal reference. All melting points have been determined by means of a Reichert melting point microscope.

EXAMPLE 1

16α, 17α-(2'-Hydrogen-2'-methyl)methylene dioxy-9-fluorpregna-1,4-diene-11β, 21-diol-3,20-dione.

To a solution of 112.0 mg newly distilled paraldehyde and 0.2 ml 72 % perchloric acid in 75 ml well purified and dried dioxane 500.0 mg of triamcinolon were added in portions for 40 minutes. The reaction mixture was stirred for further 5.5 hours at room temperature, and was then diluted with 200 ml methylene chloride. The solution was washed twice with a 15 % sodium bicarbonate solution and three times with water and dried. The solvents were evaporated in vacuum and the residue was taken up in ether and precipitated with petroleum ether. The dried crude product (533.0 mg) was chromatographed on a column packed with hydroxypropylated, cross-linked dextran gel (Sephadex LH-20, molecular weight range 100–4000; Pharmacia Fine Chemicals, Uppsala, Sweden) using methylene chloride as an eluting agent. This resulted in 431.7 mg (81 %) pure isomeric mixture having the following characteristics: Melting point about 207°–222°C; $[\alpha]_D^{25}$ = +107.2° (c=0.3 in $CH_2Cl_2$), molecular weight = 420 (theor. 420.5).

The isomeric mixture (338.2 mg) was rechromatographed on a column packed with Sephadex LH 20 and using chloroform as an eluting agent. Two different isomers, A and B, of 16α, 17α-(2'-hydrogen-2'-methyl)methylene dioxy-9-fluorpregna-1,4-diene-11β-diol-3,20-dione were obtained in the following yields and having the following characteristics: A: 123.4 mg (37 %); melting point 217°–19°C; $[\alpha]_D^{25}$ = +87.5° (c= 0.3 in $CH_2Cl_2$); molecular weight = 420 (theor. 420.5) (Retention volume 920–990 ml). B: 194.7 mg (58 %); melting point 224°–28°C; $[\alpha]_D^{25}$ = +120.8° (c= 0.3 in $CH_2Cl_2$); molecular weight = 420 (theor. 420.5) (Retention volume 1020–1100 ml). The isomer purity (>98 %) of A and B was determined by NMR spectroscopy by studying the signal for 18-$CH_3$ positioned at δ = 1.00 ppm ($CDCl_3$) for A and at δ = 0.92 ppm ($CDCl_3$) for B.

Similar separation results have been obtained by using a gel of copolymers of vinyl acetate (Merckogel OR-PVA 2000 molecular weight range up to 1000; AG E. Merck, Darmstadt, Western Germany), as well as by using, in addition to chloroform and methylene chloride, ethylene chloride, ethyl acetate, tetrahydrofurane and dioxane as eluting agents on both types of gel materials.

EXAMPLES 2–15

Analogous to the process described in Example 1 different isomeric mixtures were prepared, the isomers given in Table 1 below being obtained by means of separation according to Example 1. The NMR-investigations were carried out in $CDCl_3$ if not otherwise stated.

Table 1

| Ex. No. | The 16α,17α-derivative of | with | Isomer | $[\alpha]_D^{25}$ (c=0.2 in $CH_2Cl_2$) | Mp (°C) | Molecular weight found | Molecular weight calculated | 18-$CH_3$ δ (ppm) | Retention volume (ml) |
|---|---|---|---|---|---|---|---|---|---|
| 2 | triamcinolone | propionaldehyde | A | + 85.1° | 204–7 | 434 | 434.5 | 0.99 | 840–862 |
|   |   |   | B | +112.7° | 189–92 | " | " | 0.93[1] | 924–990 |
| 3 | " | n-butyraldehyde | A | + 77.5° | 150–5 | 448 | 448.5 | 1.00 | 822–876 |
|   |   |   | B | +105.5° | 147–50 | " | " | 0.93 | 912–984 |
| 4 | " | n-valeric aldehyde | A | + 73.7° | 123–7 | 462 | 462.6 | 0.99 | 780–801 |
|   |   |   | B | + 93.6° | 102–6 | " | " | 0.93 | 864–924 |
| 5 | " | n-caproic aldehyde | A | + 70.1° | 172–9 | 476 | 476.6 | 1.00 | 702–738 |
|   |   |   | B | + 97.9° | 180– 5 | " | " | 0.93 | 768–828 |
| 6 | " | n-decyl aldehyde | A | + 63.6° | 161–4 | 532 | 532.7 | 0.99 | 540–85 |
|   |   |   | B | + 91.3° | 147–52 | " | " | 0.93 | 595–648 |
| 7 | fluocinolone | acetaldehyde | A | + 71.1° | 232–5 | 438 | 438.5 | 0.88[1] | 1200–1250 |
|   |   |   | B | +110.8° | 224–7 | " | " | 0.83[1] | 1260–1350 |
| 8 | " | n-butyraldehyde | A | + 69.0° | 196–200 | 466 | 466.5 | 0.98 | 1130–1190 |
|   |   |   | B | + 94.5° | 169–72 | " | " | 0.93 | 1225–1320 |
| 9 | " | n-caproic aldehyde | A | + 65.9° | 143–7 | 494 | 494.6 | 0.98 | 870–930 |
|   |   |   | B | + 92.7° | 167–70 | " | " | 0.92 | 960–1015 |
| 10 | " | n-caprylic aldehyde | A | + 61.0° | 166–9 | 522 | 522.6 | 0.98 | 735–765 |
|   |   |   | B | + 88.2° | 124–7 | " | " | 0.93 | 790–850 |
| 11 | 11β, 16α, 17α, 21-tetra-hydroxy-4-pregnene-3,20-dione | acetaldehyde | A | +144.8° | 177–85 | 404 | 404.5 | 0.98 | 396–414 |
|   |   |   | B | +164.6° | 202–10 | " | " | 0.91 | 432–453 |
| 12 | prednacinolone | n-butyraldehyde | A | + 85.6° | 225–28 | 430 | 430.5 | 0.99 | 450–68 |
|   |   |   | B | +105.3° | 259–60 | " | " | 0.93 | 510–20 |
| 13 | " | n-caproic aldehyde | A | + 72.9° | 198–201 | 458 | 458.6 | 0.99 | 414–32 |
|   |   |   | B | +104.5° | 167–71 | " | " | 0.93 | 462–98 |
| 14 | " | n-caprylic aldehyde | A | + 67.6° | 169–73 | 486 | 486.7 | 0.99 | 355–365 |
|   |   |   | B | + 96.3° | 143–46 | " | " | 0.93 | 385–400 |
| 15 | " | n-decyl aldehyde | A | + 66.0° | 157–66 | 514 | 514.7 | 0.99 | 330–350 |
|   |   |   | B | + 93.2° | 124–7 | " | " | 0.93 | 365–385 |

[1]$DMSO_6$

EXAMPLE 16

Resolution of 16α, 17α-(2'-hydrogen-2'-methyl)methylenedioxy-11β-hydroxy-21-(benzofurane-2-carbonyloxy)-9-fluorpregna-1,4-diene-3,20-dione into isomers.

A solution of 60 mg pure isomeric mixture of 16α, 17α-(2'-hydrogen-2'-methyl)methylenedioxy-9-fluorpregna-1,4-diene-11α, 21-diol-3,20-dione in 2 ml of dry pyridine was added to 72.2 mg benzofurane-2-carboxylic acid chloride dissolved in 1 ml dry dioxane. The reaction mixture was allowed to stand under stirring at room temperature over night, the major part of the solvents were evaporated in vacuum and the residue was poured into 30 ml of 3 % ammonium chloride solution. The precipitate obtained was separated by centrifugation and dissolved in 100 ml of chloroform. The chloroform solution was washed once with 5 % sodium carbonate solution, three times with water, dried over magnesium sulphate and evaporated in vacuum. The residue was chromatographed on Sephadex LH-20 using chloroform as an eluant. Two different isomers, A and B, of 16α, 17α-(2'-hydrogen-2'-methyl)methylenedioxy-11β-hydroxy-21-(benzofurane-2-carbonyloxy)-9-fluorpregna-1,4-dione-3,20- dione were obtained in the following yields and having the following characteristics:

A: 28.1 mg (35%); melting point 250°–56°C; $[\alpha]_D^{25} = +158.9°$ (c = 0.2 in $CH_2Cl_2$); molecular weight = 564 (theor. 564.6). Retention volume 270–90 ml.

B: 24.2 mg (30%); melting point 247°–50°C; $[\alpha]_D^{25} = +168.3°$ (c = 0.2 in $CH_2Cl_2$); molecular weight = 564 (theor. 564.6). Retention volume 300–60 ml.

The isomer purity (>98%) of A and B was determined by NMR-spectroscopy by studying the signal for 18-$CH_3$ positioned at $\delta = 1.06$ ppm ($CDCl_3$) for A and at $\delta = 1.03$ ppm ($CDCl_3$) for B.

Similar separation results have been obtained by using Merckogel OR-PVA 2000, as well as using, in addition to chloroform, methylene chloride, ethylene chloride, ethyl acetate, tetrahydrofurane and dioxane as eluting agents on both types of gel materials.

EXAMPLES 17–28

Different 21-esters of the isomeric mixtures prepared according to Examples 1–15 were prepared analogous to the process described in Example 16. By analogous purification and separation the isomers given below in Table 2 were obtained. The NMR-investigations were carried out in $CDCl_3$.

The acid chlorides used for the esterification are indicated in Table 2 in the following manner. NAC = nicotinic acid chloride, AAC = acetyl chloride, VAC = valeric acid chloride, BAC = benzofurane-2-carboxylic acid chloride.

Below there are given examples of gelenic preparations prepared in a conventional manner:

Example 29. Ointment, fat anhydrous.

| | |
|---|---|
| Steroid | 0.001–0.2 |
| Cetanol | 5 |
| Liquid paraffin | 20 |
| Vaseline to | 100 g |

Example 30. Cream.

| | |
|---|---|
| Steroid | 0.001–0.2 |
| Monolein | 2.5 |
| Wool fat | 5 |
| Vaseline | 42 |
| Citric acid | 0.3 |
| Sodium citrate | 0.9 |
| Water to | 100 g |

-continued

Example 31. Liniment.

| | |
|---|---|
| Steroid | 0.001–0.2 |
| Cetanol | 3.2 |
| Stearol | 0.2 |
| Polyoxyethylene sorbitan monolaurate | 2 |
| Sorbitan monopalmitate | 0.5 |
| Propylene glycol | 4.8 |
| Metagin [a] | 0.08 |
| Propagin [b] | 0.02 |
| Water to | 100 g |

[a] methylester of parahydroxybenzoic acid
[b] propyl ester of parahydroxybenzoic acid Example 32. Tincture.

| | |
|---|---|
| Steroid | 3–500 mg |
| Ethanol 60 % to | 100 ml |

Example 33. Suspension for injection.

| | |
|---|---|
| Steroid | 0.05–10 mg |
| Sodium carboxymethyl cellulose | 7 mg |
| Sodium chloride | 7 mg |
| Tween 80 [c] | 0.5 mg |
| Phenyl carbinol | 8 mg |
| Water, sterile to | 1 mg |

[c] polyoxyethylene(20)sorbitan monooleate.

Example 34. Foam aerosol.

| | |
|---|---|
| Steroid | 0.001 – 0.2 |
| Glycerol | 4 |
| Na-cetyl stearyl alcohol | 0.2 |
| Cetyl stearyl alcohol | 3 |
| Isopropylmyristate | 2 |
| Metagin | 0.1 |
| Water | 80 |
| Tetrafluordichlormethane/ difluordichloromethane 40:60 to | 100 g |

As will be clear from the following presentation of experimental results, one of the stereoisomeric compo- Table 2

| Ex. No. | the 21-ester of isomeric mixture according to Ex. No. | with | Isomer | $[\alpha]_D^{25}$ (c=0.2 in $CH_2Cl_2$)° | Mp. °C | Molecular weight found: | calculated: | 18-$CH_3$ $\delta$(ppm) | Retention vol. (mls) |
|---|---|---|---|---|---|---|---|---|---|
| 17 | 1 | NAC | A | +121.6° | 268–70 | 525 | 525.6 | 1.07 | 340–65 |
|    |   |     | B | +135.0° | 275–7  | ''  | ''    | 1.03 | 375–410 |
| 18 | 1 | VAC | A | + 76.6° | 248–51 | 504 | 504.6 | 1.00 | 276–306 |
|    |   |     | B | +102.4° | 261–4  | ''  | ''    | 0.97 | 318–354 |
| 19 | 1 | AAC | A | + 87.2° | 235–8  | 462 | 462.5 | 0.96 | 325–55 |
|    |   |     | B | +111.0° | 259–63 | ''  | ''    | 0.93 | 360–90 |
| 20 | 3 | BAC | A | +139.1° | 135–45 | 592 | 592.7 | 1.07 | 250–75 |
|    |   |     | B | +157.8° | 205–12 | ''  | ''    | 1.03 | 280–320 |
| 21 | 3 | NAC | A | +102.0° | 207–10 | 553 | 553.6 | 1.07 | 320–45 |
|    |   |     | B | +132.9° | 252–4  | ''  | ''    | 1.04 | 350–80 |
| 22 | 3 | VAC | A | + 67.0° | 170–1  | 532 | 532.7 | 1.00 | 255–80 |
|    |   |     | B | + 97.7° | 254–6  | ''  | ''    | 0.97 | 285–310 |
| 23 | 7 | BAC | A | +143.6° | 147–52 | 582 | 582.6 | 1.06 | 280–320 |
|    |   |     | B | +164.4° | 274–8  | ''  | ''    | 1.02 | 325–65 |
| 24 | 7 | AAC | A | + 79.7° | 311–4  | 480 | 480.5 | 0.99 | 366–96 |
|    |   |     | B | +101.8° | 322–5  | ''  | ''    | 0.95 | 402–38 |
| 25 | 8 | BAC | A | +129.1° | 129–34 | 610 | 610.7 | 1.05 | 270–94 |
|    |   |     | B | +147.8° | 208–10 | ''  | ''    | 1.03 | 300–30 |
| 26 | 8 | VAC | A | + 66.8° | 212–16 | 550 | 550.7 | 0.98 | 258–82 |
|    |   |     | B | + 85.7° | 261–63 | ''  | ''    | 0.95 | 288–324 |
| 27 | 12| AAC | A | + 86.2° | 176–9  | 472 | 472.6 | 0.99 | 235–55 |
|    |   |     | B | + 97.8° | 183–6  | ''  | ''    | 0.96 | 256–75 |
| 28 | 12| BAC | A | +142.0° | 118–23 | 574 | 574.7 | 1.06 | 200–25 |
|    |   |     | B | +153.6° | 120–30 | ''  | ''    | 1.03 | 230–60 | nents, component B, has consistently physiologically superior characteristics as compared to the other stereoisomeric component and the stereoisomeric mixture. The stereoisomeric component B being the more active one of the two components A and B in the stereoisomeric pair, may be defined as the stereoisomeric component showing the highest relative rotary power. In connection with gel filtration said component may also be defined as the stereoisomer, which in the gel filtration shows the greatest retention volume, i.e. it leaves last with the eluate. Finally, said active stereoisomeric component may be defined as the component which in NMR-measurements shows the lowest $\delta$-value for 18-

$CH_3$. In the following this active stereoisomeric component will always be designated B. As regards the steroids referred to in connection with the present invention the stereoisomeric mixture as well as the individual stereoisomeric components A and B have been investigated with regard to antiinflammatory activity in granulom test on rats subjected to adrenalectomy. The experimental procedure used corresponds largely to that described by G. Engelhardt: Arzneimittel-Forschung, 13, p. 588, 1963. According to this procedure the test substances are applied topically in the implanted cotton wads. It is thereby possible to study the local antiinflammatory effect in granulomas and also systemic effects in the form of retrogression of thymus and inhibition of bodyweight growth.

Young male rats of the Sprague-Dawley strain weighing about 110–130 g were subjected to adrenalectomy under ether narcosis. Two sterilized cotton wads of each about 6 mg were implanted simultaneously subcutaneously on the lateral side of the spinal. After awakening the animals were stored 5 per cage and were supplied with normal food and 1 % sodium chloride solution as drinking water. On the eighth test day the animals were sacrificed by ether marcosis. The granuloma formed around the cotton wads were carefully recovered and thymus and body weights were measured. The two granuloma from each animal were dried over night at 80°C and weighed. After subtraction of the initial weight of the cotton wads the weight increase was used as a measure of the granulom growth.

The test substances were used dissolved in ethyl acetate. Under aseptic conditions 0.05 ml of said solutions were injected into each of the cotton wads, whereafter the solvent was allowed to evaporate in the desiccator. Normally 3 concentrations of each test substance with the standard doses 3.3, 30 and 270 γ/animal were investigated. Each test group normally comprised 10 rats. The cotton wads of the control group were injected with only ethyl acetate, but were in other respects treated in the same way. When considering the effects of the test substances the average values of granulom growth, thymus weight and body weight increase day 0–8 were measured in each group in absolute figures and in % of the corresponding figure of the control group. Dose-response curves were drafted and used for estimating the doses giving 50 % reduction of granulom growth and of thymus weight and 25 % decrease of body weight increase.

The results of the experiments carried out with the steroids in question are summarized in Table 3 below. From said table it is immediately clear, that difference in activity is found between the stereoisomeric components in each isomer pair, and that it is always the isomer last eluted from the gel column, which shows the highest activity. By means of the separation process of the present invention it has been possible to show that one of the stereoisomeric components, namely component B, shows a clearly stronger antiinflammatory effect than that obtained with the corresponding stereoisomeric mixture.

Irrespective of the interest to find steroid structures having a high activity there is a great demand for new compounds showing a better relation between antiinflammatory effect and the non-desired systemic effects, that may be observed after the resorption of the compounds. Thymus regression and inhibition of body growth may be seen as examples of such non-desired effects. From the table it is clear that in order to obtain a good antiinflammatory effect (50 % inhibition of granulom growth) it is necessary with regard to the reference substances Triamcinolone acetonide and Fluocinolone acetonide to resort to doses of such a level (about 125 and 50 γ/animal, respectively) as to simultaneously result in a heavy decrease of thymus weight and body weight growth among the test animals. With regard to the compounds of the invention the doses needed for 50 % inhibition of granuloma growth are, however, lower than or possibly of the same level as those giving a thymus regression or body growth inhibition.

Even if component A does not show an antiinflammatory effect as pronounced as that of corresponding component B it may in certain cases be more advantageous to use component A as such instead of the isomeric mixture with regard to better characteristics regarding non-desired systemic effects.

Table 3

Table summarizing biological effects of investigated compounds

| Compound prepared according to Example No. | Isomer | Dose (γ/animal) required to obtain | | |
|---|---|---|---|---|
| | | 50% inhibition of | | 25% inhibition |
| | | Granuloma growth | Thymus weight | Body weight Increase |
| Triamcinolone acetonide | — | 125 | 70 | 100 |
| 1 | A+B | 120 | 270 | >270 |
| 1 | A | 270 | 115 | 60 |
| 1 | B | 30 | 50 | 30 |
| 2 | A+B | 35 | 100 | 140 |
| 2 | A | 25 | 130 | 90 |
| 2 | B | 10 | 60 | 100 |
| 3 | A+B | 10 | >30 | >30 |
| 3 | A | 25 | >30 | >30 |
| 3 | B | 3 | 17 | 100 |
| 4 | A+B | <3 | 70 | 170 |
| 4 | A | <3 | 100 | 170 |
| 4 | B | <3 | 50 | 100 |
| 5 | A+B | 17 | 130 | >270 |
| 5 | A | 30 | 90 | >270 |
| 5 | B | 10 | 90 | >270 |
| Fluocinolone acetonide | — | 50 | 14 | 20 |
| 7 | A | 15 | 12 | 20 |
| 7 | B | 10 | 6 | 15 |
| 8 | A+B | 5 | 10 | 50 |
| 8 | A | 6 | 13 | 50 |
| 8 | B | 4 | 10 | 50 |
| Prednacinolone acetonide | — | 270 | 105 | >270 |
| acetonide | A+B | 100 | 80 | 80 |

Table 3-continued

Table summarizing biological effects of investigated compounds

| Compound prepared according to Example No. | Isomer | Dose (γ/animal) required to obtain | | 25% inhibition Body weight Increase |
|---|---|---|---|---|
| | | 50% inhibition of | | |
| | | Granuloma growth | Thymus weight | |
| 12 | A | 125 | 125 | >270 |
| 12 | B | 40 | 70 | 50 |
| 13 | A+B | 10 | 175 | 90 |
| 13 | A | 8 | >270 | 100 |
| 13 | B | 5 | 210 | >270 |
| 16 | A | 5 | 70 | >45 |
| 16 | B | 3 | 10 | 10 |
| 17 | A | 7 | 45 | 20 |
| 17 | B | 3 | 13 | 20 |
| 18 | A | <3 | 70 | 33 |
| 18 | B | <3 | 10 | 10 |
| 20 | A+B | <3 | 25 | 20 |
| 20 | A | <3 | 90 | 50 |
| 20 | B | <3 | 20 | 5 |
| 21 | A+B | 7 | 35 | 10 |
| 21 | A | <3 | 70 | 70 |
| 21 | B | <3 | 10 | 5 |
| 22 | A+B | 10 | 50 | 30 |
| 22 | A | <3 | 90 | 33 |
| 22 | B | <3 | 35 | 5 |
| 25 | A+B | <3 | 10 | 10 |
| 25 | A | <3 | 15 | 20 |
| 25 | B | <3 | 7 | 20 |
| 27 | A+B | <3 | 60 | 40 |
| 27 | A | <3 | 100 | 100 |
| 27 | B | <3 | 60 | 35 |

The compounds may be used to treat inflammation in any living mammalian animal body by administering thereto an effective anti-inflammatory amount of the compound in any suitable form and by any suitable mode of administration, e.g. topically, orally, or parenterally, in the same manner as their parent compounds, but generally with greater efficiency and therefore generally in lower dosages and according to somewhat lower dosage regimens.

As representative of living animal bodies which may be treated with the compounds and compositions of the invention, and according to the method of treating of the invention, for alleviation of the same and/or similar conditions as those described, the following may be mentioned: domestic animals such as dogs and cats, farm animals such as horses, cows, sheep and goats.

Particularly preferred compounds are (Reference being had to component B throughout said examples):

EXAMPLE 1

16α,17α-(2'-hydrogen-2'-methyl)methylenedioxy-9-fluoropregna-1,4-diene-11β,21-diol-3,20-dione.

EXAMPLE 3

16α,17α-(2'-hydrogen-2'-n-propyl)methylenedioxy-9-fluoropregna-1,4-diene-11β,21-diol-3,20-dione.

EXAMPLE 7

16α,17α-(2'-hydrogen-2'-methyl)methylenedioxy-6α,9-difluoropregna-1,4-diene-11β,21-diol-3,20-dione.

EXAMPLE 8

16α,17α-(2'-hydrogen-2'-n-propyl)methylenedioxy-6α,9-difluoropregna-1,4-diene-11β,21-diol-3,20-dione.

EXAMPLE 12

16α,17α-(2'-hydrogen-2'-n-propyl)methylenedioxypregna-1,4-diene-11β,21-diol-3,20-dione.

What is claimed is:

1. A process for the resolution of stereoisomeric mixtures (isomer pairs) of steroids having the general formula:

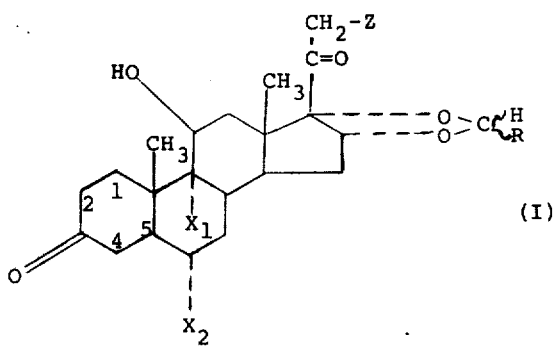

(I)

wherein the 1,2-position is saturated or a double bond is present in that position, a double bond always being present in at least the 4,5 position, $X_1$ and $X_2$ are independently selected from hydrogen and fluorine, $X_1$ being selected from hydrogen and fluorine when $X_2$ is hydrogen and $X_1$ being fluorine when $X_2$ is fluorine, Z is selected from hydroxyl and esterified hydroxyl wherein the hydroxyl group is esterified with a member of the group consisting of phosphoric and sulphuric acids, dicarboxylic acids having 2–12 carbon atoms, pyridine-3-carboxylic acid, pyridine-4-carboxylic acid, benzofurane-2-carboxylic acid, and menthoxy-methylcarboxylic acid, and lower-alkanoic acids, and R is selected from alkyl groups with straight or branched hydrocarbon chains having 1–10 carbon atoms, into their stereoisomeric components with regard to the space orientation of the substituents on the 2'-carbon atom of the dioxolane ring, characterized by subjecting the stereoisomeric mixture to gel filtration using cross-linked dextran or vinylacetatepolymer gel, the components in view of different retention volumes being separated and being separately recoverable.

2. A process according to claim 1, characterized by carrying out the gel filtration on a cross-linked dextran gel.

3. A process according to claim 2, characterized in carrying out the gel filtration on Sephadex LH 20.

4. A process according to claim 1, characterized by carrying out the gel filtration on a copolymer of vinyl acetate.

5. A process according to claim 4, characterized by carrying out the gel filtration on Merckkogel OR-PVA.

6. A process according to any of claim 1, characterized by carrying out the gel filtration by means of an eluating agent selected from halogenated hydrocarbons, ethers and esters.

7. A process according to claim 6, characterized by carrying out the gel filtration with an eluating agent selected from ethyl acetate, acetonitrile, methylene chloride and chloroform.

8. Stereoisomeric component B of a stereoisomeric mixture (isomeric pair) of a steroid having the general formula:

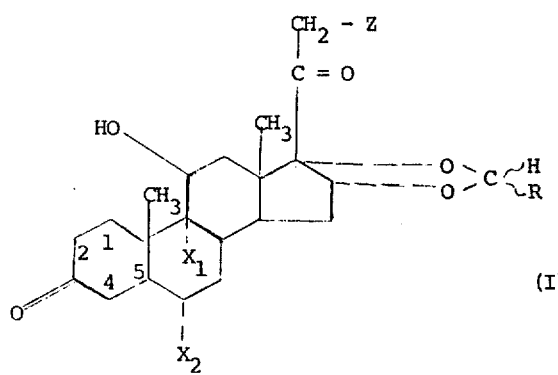

(I)

wherein the 1,2-position is saturated or a double bond is present in that position, a double bond always being present in at least the 4,5-position, $X_1$ and $X_2$ are independently selected from hydrogen and fluorine, $X_1$ being selected from hydrogen and fluorine when $X_2$ is hydrogen and $X_1$ being fluorine when $X_2$ is fluorine, Z is selected from hydroxyl and esterified hydroxyl wherein the hydroxyl group is esterified with a member of the group consisting of phosphoric and sulphuric acids, dicarboxylic acids having 2–12 carbon atoms, pyridine-3-carboxylic acid, pyridine-4-carboxylic acid, benzofurane-2-carboxylic acid, and menthoxy-methylcarboxylic acid, and lower alkanoic acids, and R is selected from alkyl groups with straight or branched hydrocarbon chains, having 1–10 carbon atoms, said component B being the isomer of the isomer pair showing the greatest relative rotary power or having the greatest retention volume in gel filtration using a cross-linked dextran gel.

9. Stereoisomeric component according to claim 8 characterized in that R is an alkyl group having 1–6 carbon atoms.

10. Stereoisomeric component according to claim 9, wherein Z is hydroxyl esterified with an acid selected from acetic acid, propionic acid, butyric acid, valeric acid, isovaleric acid, trimethyl acetic acid, hexanoic acid, tert. butylacetic acid and octanoic acid.

11. Stereoisomeric component according to claim 9, wherein Z is hydroxyl esterified with an acid selected from pyridine-3—, pyridine-4—, benzofurane-2-carboxylic acid and methoxymethylcarboxylic acids.

12. Stereoisomeric component according to claim 9, wherein Z is hydroxyl esterified with an acid selected from dicarboxylic acids, preferably such acids having 2–12 carbon atoms.

13. Stereoisomeric component according to claim 9, wherein Z is hydroxyl esterified with an acid selected from phosphoric and sulphuric acids.

14. Stereoisomeric component B according to claim 8, which is 16α,17α-(2'-hydrogen-2'-methyl)methylenedioxy-9-fluoropregna-1,4-diene-11β,21-diol-3,20-dione.

15. Stereoisomeric component B according to claim 8, which is 16α,17α-(2'-hydrogen-2'-n-propyl)methylenedioxy-9-fluoropregna-1,4-diene-11β,21-diol-3,20-dione.

16. Stereoisomeric component B according to claim 8, which is 16α,17α-(2'-hydrogen-2'-methyl)methylenedioxy-6α,9-difluoropregna-1,4-diene-11β,21-diol-3,20-dione.

17. Stereoisomeric component B according to claim 8, which is 16α,17α-(2'-hydrogen-2'-n-propyl)methylenedioxy-6α,9-difluoropregna-1,4-diene-11β,21-diol-3,20-dione.

18. Stereoisomeric component B according to claim 8, which is 16α,17α-(2'-hydrogen-2'-n-propyl)methylenedioxypregna-1,4-diene-11β,21-diol-3,20-dione.

19. A process according to claim 1, wherein the steroid is 16α,17α-(2'-hydrogen-2'-methyl)methylenedioxy-9-fluoropregna-1,4-diene-11β,21-diol-3,20-dione.

20. A process according to claim 1, wherein the steroid is 16α,17α-(2'-hydrogen-2'-n-propyl)methylenedioxy-9-fluoropregna-1,4-diene-11β,21-diol-3,20-dione.

21. A process according to claim 1, wherein the steroid is 16α,17α-(2'-hydrogen-2'-methyl)methylenedioxy-6α,9-difluoropregna-1,4-diene-11β,21-diol-3,20-dione.

22. A process according to claim 1, wherein the steroid is 16α,17α-(2'-hydrogen-2'-n-propyl)methylenedioxy-6α,9-difluoropregna-1,4-diene-11β,21-diol-3,20-dione.

23. A process according to claim 1, wherein the steroid is 16α,17α-(2'-hydrogen-2'-n-propyl)methylenedioxypregna-1,4-diene-11β,21-diol-3,20-dione.

* * * * *

UNITED STATES PATENT OFFICE
CERTIFICATE OF CORRECTION

Patent No. 3,928,326　　　　　　　　　Dated　December 23, 1975

Inventor(s) Ralph Lennart Brattsand et al.

It is certified that error appears in the above-identified patent and that said Letters Patent are hereby corrected as shown below:

[30] Foreign Application Priority Data

May 19, 1972　Sweden　6645/72

Primary Examiner - Elbert L. Roberts

Column 9, line 24 "marcosis" should be --narcosis--

Col. 10, last line of table "acetonide" should be --12--

Signed and Sealed this
Tenth Day of August 1976

[SEAL]

Attest:

RUTH C. MASON　　　　　　　　　C. MARSHALL DANN
Attesting Officer　　　　　　　Commissioner of Patents and Trademarks